United States Patent
Herger et al.

(10) Patent No.: US 10,164,830 B2
(45) Date of Patent: *Dec. 25, 2018

(54) ROLE AND PROXIMITY-BASED MANAGEMENT OF NETWORKS

(71) Applicant: International Business Machines Corporation, Armonk, NY (US)

(72) Inventors: Lorraine M. Herger, Port Chester, NY (US); Neal M. Keller, Pleasantville, NY (US); James R. Kozloski, New Fairfield, CT (US); Matthew A. McCarthy, Holly Springs, NC (US); Clifford A. Pickover, Yorktown Heights, NY (US); Andrew P. Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,549

(22) Filed: Oct. 27, 2017

(65) Prior Publication Data
US 2018/0077018 A1   Mar. 15, 2018

Related U.S. Application Data

(63) Continuation of application No. 14/748,702, filed on Jun. 24, 2015, now Pat. No. 9,882,777, which is a
(Continued)

(51) Int. Cl.
*H04L 12/24* (2006.01)
*H04L 12/801* (2013.01)
(Continued)

(52) U.S. Cl.
CPC .... *H04L 41/0816* (2013.01); *G06F 17/30864* (2013.01); *H04L 41/147* (2013.01); *H04W 16/22* (2013.01)

(58) Field of Classification Search
CPC . H04L 41/0816; H04L 41/147; H04L 47/127; H04L 41/0896; H04L 41/14; H04L 41/142; H04L 41/145; H04W 16/22
See application file for complete search history.

(56) References Cited

U.S. PATENT DOCUMENTS 7,532,898 B2   5/2009   Halcrow et al.
8,307,113 B2   11/2012  Yen
(Continued)

FOREIGN PATENT DOCUMENTS

EP   1883186      1/2008
EP   1982467      10/2008
WO   2007082912   7/2007

OTHER PUBLICATIONS

Kang, J.H., et al., "Extracting Places from Traces of Locations," Proceedings of the 2nd ACM International Workshop on Wireless Mobile Applications and Services on WLAN Hotspots, Oct. 2004, pp. 110-118.
(Continued)

*Primary Examiner* — Scott M Sciacca
(74) *Attorney, Agent, or Firm* — Fleit Gibbons Gutman Bongini Bianco PL; Thomas S. Grzesik

(57) ABSTRACT

Various embodiments manage computing networks. In one embodiment, a set of network management data associated with one or more users is analyzed. The set of network management data includes at least electronic scheduling information associated with the one or more users. A concentration of users is predicted for a given location based on the analyzing. At least one network characteristic associated with the given location is performed based on at least the predicted concentration of users.

18 Claims, 9 Drawing Sheets

Related U.S. Application Data continuation of application No. 14/627,345, filed on Feb. 20, 2015, now Pat. No. 9,860,123.

(60) Provisional application No. 61/978,231, filed on Apr. 11, 2014.

(51) Int. Cl.
*G06F 17/30* (2006.01)
*H04W 16/22* (2009.01)

(56) References Cited

U.S. PATENT DOCUMENTS

| | | | |
|---|---|---|---|
| 8,547,834 | B1 | 10/2013 | Reeves et al. |
| 2002/0079371 | A1 | 6/2002 | Bobrow et al. |
| 2004/0196790 | A1 | 10/2004 | Balakrishnan et al. |
| 2009/0089438 | A1 | 4/2009 | Agarwal et al. |
| 2010/0296403 | A1 | 11/2010 | Qiu et al. |
| 2012/0020216 | A1* | 1/2012 | Vashist ............... H04L 41/14 370/235 |
| 2012/0238287 | A1 | 9/2012 | Scherzer |
| 2012/0324091 | A9 | 12/2012 | Raleigh et al. |
| 2013/0067112 | A1 | 3/2013 | Delos Reyes et al. |
| 2013/0103764 | A1 | 4/2013 | Verkasalo |
| 2013/0183928 | A1 | 7/2013 | Scarr et al. |
| 2013/0308470 | A1 | 11/2013 | Bevan et al. |
| 2013/0329552 | A1 | 12/2013 | Carnero Ros et al. |
| 2014/0188935 | A1 | 7/2014 | Vee et al. |
| 2015/0006632 | A1 | 1/2015 | Tomkins et al. |
| 2015/0142822 | A1* | 5/2015 | Xue ............... G06F 17/3087 707/743 |
| 2015/0271727 | A1 | 9/2015 | Harrang |
| 2015/0289146 | A1 | 10/2015 | Ouyang et al. |
| 2017/0013408 | A1 | 1/2017 | Grzywaczewski et al. |

OTHER PUBLICATIONS

Ibikunle, F.A., "Comparative Analysis of Alternative Last Mile Broadband Access Technologies (Wi-Fi and WiMAX)," The Pacific Journal of Science and Technology, May 2009, pp. 280-285. vol. 10, No. 1.

Pasha, M., et al., "A Study of Wi-Fi enabled Vehicular Networks using QualNet Simulator," Proceedings of the 4th National Conference; INDIACom, Computing for Nation Development, Feb. 25-26, 2010, pp. 1-6.

Siris, V.A., et al., "Enhancing Mobile Data Offloading with Mobility Prediction and Prefetching," MobiArch'12, Aug. 22, 2012, pp. 1-6.

Cisco, "Cisco CleanAir Technology," 2012. Downloaded from web site on Jan. 17, 2014. pp. 1-4.

Motorola, "Mesh Networks, Decentralized, self-forming, self-healing networks that achieve unprecedented coverage, throughput, flexibility and cost efficiency." Jan. 1, 2005. pp. 1-5.

Aruba, "Next-Generation Wireless Mesh Networks: Combining a multi-radio architecture with high-performance routing to optimize video surveillance and other multimedia-grade applications," Aruba Networks, Mar. 2011, pp. 1-14.

Aruba, "Aruba Policy Enforcement Firewall: Optimizing Mobile Application Delivery Over Wi-Fi," 2012, pp. 1-3.

Aruba, "Adaptive Radio Management Best-in-class Rf management," Tech Brief, 2013, pp. 1-4.

List of IBM Patents or Patent Applications Treated as Related.

* cited by examiner

| 302 | 304 | 306 | 308 | |
|---|---|---|---|---|
| ID | LOCATION | TEMPORAL INFORMATION | KEYWORDS | |
| ENTITY_A 310 | LOCATION_1 312 | DATE_A TO DATE_Y 314 | TRADESHOW_A TRADESHOW NEW YORK 316 | ... |
| ENTITY_B | LOCATION_2 | DATE_B TIME_A TO TIME_C | KEYWORD_B KEYWORD_C | ... |
| ... | ... | ... | ... | ... |
| ENTITY_N | LOCATION_N | DATE_M TO DATE_Y | KEYWORD_N | ... |

FIG. 3

|        | DATE_A         | DATE_B         | DATE_M           |     |
|--------|----------------|----------------|------------------|-----|
| TIME_1 | ENTRY_1 402    | ENTRY_4 408    |                  | ... |
| TIME_2 | ENTRY_2 404    | ENTRY_5 410    | TRADESHOW_A 414  | ... |
| ...    | ...            | ...            | ...              | ... |
| TIME_N | ENTRY_3 406    | ENTRY_6 412    |                  | ... |

FIG. 4

SOCIAL_NETWORKING_MESSAGE_1: GETTING READY TO HEAD TO NEW YORK FOR THE TRADESHOW...SEE YOU ALL THERE!

TRAVEL_RESERVATION_A: DEPART DATE_L AT TIME_1 FOR NEW WORK --- RETURN DATE_P AT TIME_2

| 702 | 704 | 706 | 708 | 710 | 712 | 714 | |
|---|---|---|---|---|---|---|---|
| DEVICE ID | DEVICE TYPE | MANAGED ENTITY ID | DEVICE LOCATION | SECURITY | OPERATING RANGE | OPERATING BAND/SPECTRUM | |
| DEVICE_A | WIFI ROUTER | ME_1 | LOCATION_A | SEC_A SEC_B | RANGE_1 | BAND_A | ... |
| DEVICE_B | SWITCH | ME_2 | LOCATION_B | N/A | N/A | N/A | ... |
| ... | ... | ... | ... | ... | ... | ... | ... |
| DEVICE_N | MOBILE BASE STATION | ME_N | | SEC_A SEC_C SEC_N | RANGE_Y | SPECTRUM_A SPECTRUM_Z | ... |
| ... | ... | ... | ... | ... | ... | ... | ... |

FIG. 7

| RULE ID 808 | MANAGED ENTITY ID(S) 810 | NETWORKING DEVICE ID(S) 812 | RULE(S) 814 | |
|---|---|---|---|---|
| RULE_1 | ENTITY_A ENTITY_B | N/A | IF ESTIMATED USER DEMAND FOR DANDWIDTH CANNOT BE SATISFIED ADD ONE OR MORE ADDITIONAL NETWORKING DEVICES | ... |
| RULE_2 | ENTITY_B | DEVICE_5 | PERFORM CONFIGURATION OPERATIONS 1 AND 2 | ... |
| ... | ... | ... | ... | ... |
| RULE_N | ENTITY_N | DEVICE_6 | ADD NEW NETWORKING DEVICE PERFORM CONFIGURATION OPERATIONS 3, 4, AND 5 | ... |

ROLE AND PROXIMITY-BASED MANAGEMENT OF NETWORKS

BACKGROUND

The present disclosure generally relates to computing networks, and more particularly relates to managing networks based on roles and proximities of users and/or user devices.

Current strategies for providing user devices, such as wireless communication devices, with access to networks generally concentrate on local (static) WiFi hotspots or cellular networks. Such strategies usually assume that a WiFi hotspot is able to provide sufficient bandwidth to users, and that the cost of cellular data connectivity is justified based on its wide-spread availability. However, these types of networks can easily be overloaded by user demand or can become cost prohibitive for users.

BRIEF SUMMARY

In one embodiment, a method for managing a computing network is disclosed. The method comprises analyzing a set of network management data associated with one or more users. The set of network management data comprises at least electronic scheduling information associated with the one or more users. A concentration of users is predicted for a given location based on the analyzing. At least one network characteristic associated with the given location is performed based on at least the predicted concentration of users.

In another embodiment, an information processing system for managing a computing network is disclosed. The information processing system comprises memory and a processor that is communicatively coupled to the memory. A network manage is communicatively coupled to the memory and the processor. The network manager is configured to perform a method. The method comprises analyzing a set of network management data associated with one or more users. The set of network management data comprises at least electronic scheduling information associated with the one or more users. A concentration of users is predicted for a given location based on the analyzing. At least one network characteristic associated with the given location is performed based on at least the predicted concentration of users.

In a further embodiment, a computer program storage product for managing a computing network is disclosed. The computer program storage product comprises instructions configured to perform a method. The method comprises analyzing a set of network management data associated with one or more users. The set of network management data comprises at least electronic scheduling information associated with the one or more users. A concentration of users is predicted for a given location based on the analyzing. At least one network characteristic associated with the given location is performed based on at least the predicted concentration of users.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 shows one example of a managed entity list according to one embodiment of the present disclosure;

FIG. 4 shows various examples of calendar entries associated with a user according to one embodiment of the present disclosure;

FIG. 5 shows one example of a social networking message associated with a user according to one embodiment of the present disclosure;

FIG. 6 shows one example of a travel reservation associated with a user according to one embodiment of the present disclosure;

FIG. 7 shows various examples of network device profiles according to one embodiment of the present disclosure;

FIG. 8 shows various examples of network configuration rules according to one embodiment of the present disclosure;

DETAILED DESCRIPTION

Operating Environment

Figure 1:
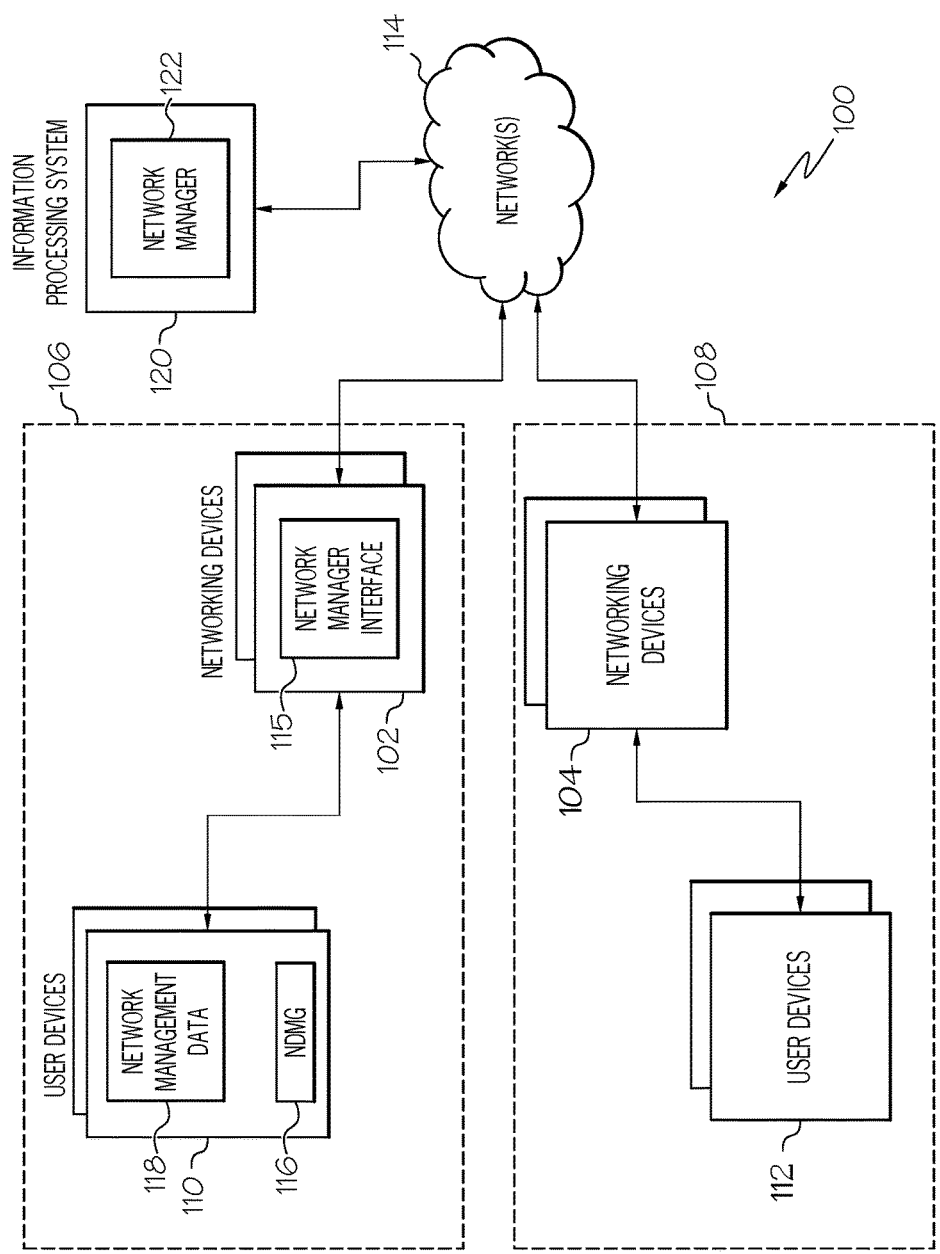
FIG. 1 is a block diagram illustrating one example of an operating environment according to one embodiment of the present disclosure.

FIG. 1 shows an operating environment 100 according to one embodiment of the present disclosure. The operating environment 100 comprises one or more networking devices 102, 104. The networking devices 102, 104 can be disposed in or associated with the same/different locations, networks, events, and/or the like. These locations, networks, events, etc. are herein referred to as "entities" or "managed entities". The networking devices 102, 104 communicatively couple user devices 110, 112 to one or more networks 114 such as, but not limited to, an Internet Protocol (IP) based network (e.g., the Internet). The networking devices 102, 104 include (but are not limited to) wireless and/or wired routers, wireless repeaters, switches, hubs, gateways, firewalls, a mobile base station/cell site (e.g., eNode B in the case of GSM and its descendants) and/or the like. The user devices 110, 112 include (but are not limited to) laptop/notebook computers, tablet computers, two-way radios, cellular telephones, mobile phones, smartphones, wireless messaging devices, desktop computers, personal digital assistants, and other similar devices.

The networking devices 102, 104, in one embodiment, are part of a wired and/or wireless network including mesh and ad-hoc networks, and communicate with the user devices 110, 112 via wired and/or wireless links. For example, the networking devices 102, 104, in one embodiment, can be part of a Wireless Fidelity (WiFi) network and/or a wireless communication network such as (but not limited to) one or more of a Long Term Evolution (LTE) network, LTE Advanced (LTE-A) network, an Evolution Data Only (EV-DO) network, a GPRS network, a Universal Mobile Telecommunications System (UMTS) network, and the like. The networking devices 102, 104, in one embodiment, comprise one or more interfaces 115 configured to communicate and interact with a network manager 122, which is discussed in greater detail below.

The user devices 110, 112, in one embodiment, comprise a network management data generator (NMDG) 116 such as (but not limited to) an application, application programming interface (API), and/or the like. The NMDG 116 generates network management data 118 associated with the user device 110, 112 and/or its user. In other embodiments, the NMDG 116 interfaces with other applications and/or services that generate network management data 118. Examples of network management data 118 include (but are not limited to) electronic schedule information (e.g., calendar entries, travel reservation databases, etc.), social networking information (project-based social ties, social network postings/feeds, blogs, etc.), location based information (e.g., VPN login information, GPS information, etc.), email information, messaging information, and/or the like. In one embodiment, the network management data 118 is stored on the user devices 110, 112 and/or is maintained on one or more remote information processing systems (not shown).

Figure 2:
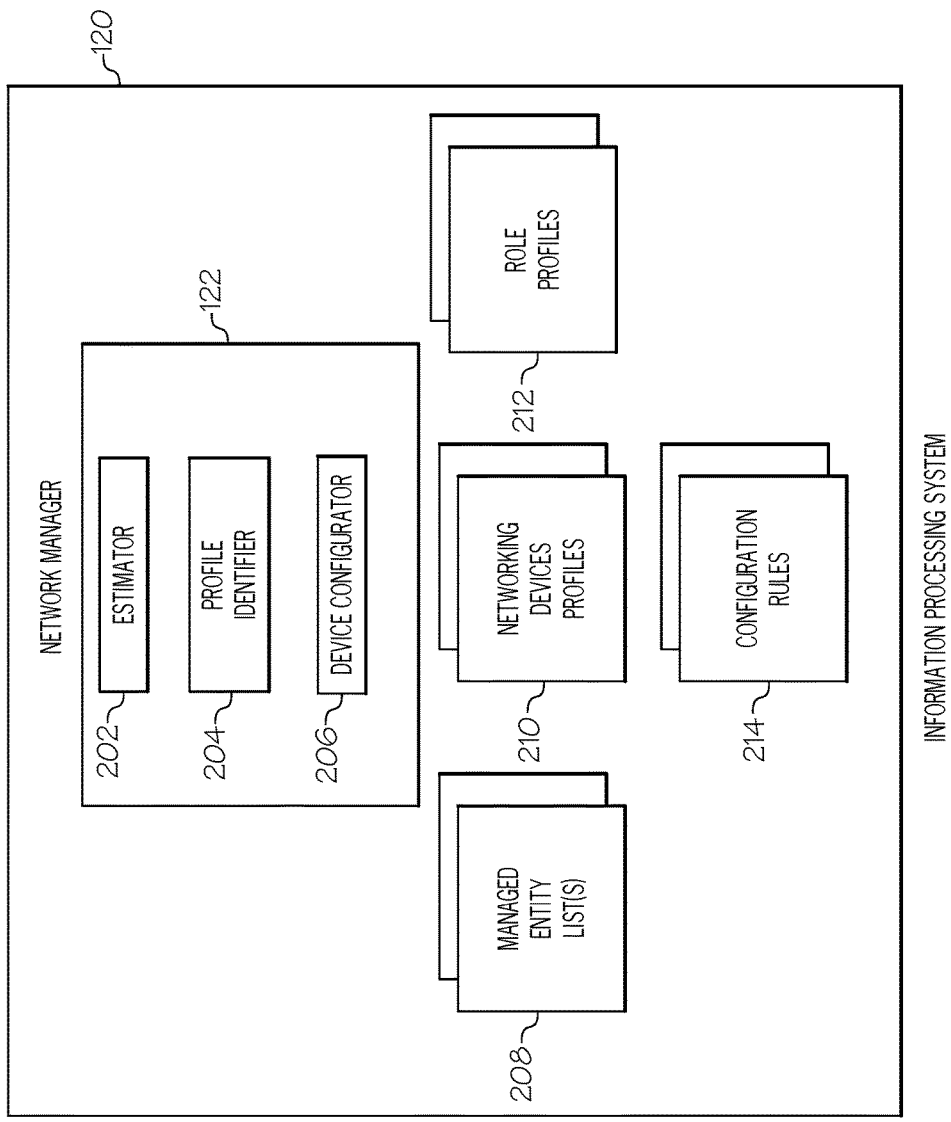
FIG. 2 illustrates various a detailed view of a network manager according to one embodiment of the present disclosure.

The operating environment 100 further comprises one or more information processing systems 120 communicatively coupled to the networking devices 102, 104. In one embodiment, the information processing system(s) is further coupled to the user devices 110, 112 and/or the network(s) 114. The information processing system 120, in one embodiment, comprises a network manager 122. FIG. 2 shows the network manager 122 in greater detail. In this example, the network manager 122 comprises an estimator 202, a role identifier 204, and a network configurator 206. The information processing system 120 further comprises a list of managed entities (e.g., networks, locations, events, etc.) 208, networking device profiles 210, role profiles 212, and configuration rules 214. It should be noted that, in one embodiment, a separate information processing system 120 is not required. In this embodiment, the network manager 122, managed entity list 208, networking device profiles 210, role profiles 212, and/or configuration rules 214 reside within at least one of the networking devices 102, 104. Each of the components shown in FIG. 2 is discussed in greater detail below. The network manager 122, in one embodiment, can be disposed within a cloud or non-cloud computing environments. In an embodiment where the network manager 122 is disposed within a cloud computing environment, the network manager 122 is offered as a service by one or more service providers.

As will be discussed in greater detail below, the network manager 122 utilizes the network management data 118 to estimate/predict user demand for networking resources at a given entity 106, 108. The network manager 122 also identifies one or more roles associated with users and/or their devices 110, 112. The network manager 122 utilizes the estimated/predicted demand and/or identified roles to dynamically manage networking resources associated with one or more of the entities 106, 108. For example, the networking manager 118 triggers/performs one or more network configuration operations based on the predicted user demand and/or the identified roles. These operations include (but are not limited to) dynamically deploying a networking device to the location 103, 105 for satisfying the predicted user demand; dynamically changing one or more operating attributes/characteristics of one or more networking devices; directing a set of users to specific areas of the network; and/or the like.

Managing Networks Based on User/Device Role and Proximity

As discussed above, the network manager 122 utilizes predicted user demand and/or identified roles to trigger/perform one or more network configuration operations for managed entities. For example, the network manager 122 utilizes predicted user demand and/or identified roles to efficiently and automatically organize WiFi hotspots by changing their characteristics (e.g., device location and capabilities) in real-time based on the concentration of people/devices in a given location and the roles of those people/devices. In another example, the network manager 122 automatically adds WiFi hotspots/repeaters to a managed entity 106 to provide a generic/common interface to a network coupled to the Internet regardless of whether the network includes wired, land-line, cellular, and/or satellite links to the Internet. In yet another In one embodiment, the network manager 122 analyzes network management data 118 associated with users (or their devices 110, 112) to calculate/predict a demand for network resources at an entity 106. Examples of network resources include (but are not limited to) bandwidth, security, spectrum, signal strength, wireless band, and/or the like. In this embodiment, the network manager 122 obtains network management data 118 associated with each of a plurality of users and/or user devices 110, 112. Users can be individuals who have subscribed to the network manager, employees of a business that has subscribed to the services provided by the network manager, and/or the like.

A user can manually send network management data 118 to the network manager 122, for example, via the NMDG 116. In another example, the NMDG 116 automatically sends network management data 118 to the network manager 122. In this example, network management data 118 is automatically sent to the network manager 122 as it is created/stored, or at predetermined intervals. In one embodiment, the user of a device 110 configures how and when the NMDG 116 sends network management data 118 to the network manager 116. Also, if network management data 118 associated with a given user changes (e.g., an electronic calendar entry is updated) the NMDG 116 detects the change and sends the updated network management data 118 to the network manager 122.

In another embodiment, trans-vendor services obtain anonymous network management data 118 from users. The trans-vendor services then send the anonymous network management data 118 to the network manager 122. Users can opt-in or opt-out of having their network management data 118 sent to the network manager 122. A trans-vendor service can also obtain network management data 118, such as electronic scheduling information, for various users from a plurality of different service vendors. For example, Vendor_A, Vendor_B and Vendor_N may all provide electronic scheduling services (e.g., on-line calendars) to users. The trans-vendor service obtains electronic scheduling information for a set of users from each of these different electronic scheduling services. If the sets of electronic scheduling information obtained from the vendors are in different formats, the trans-vendor service converts the electronic scheduling information into a format readable by the network manager 122. In some embodiments, the trans-vendor service anonymizes the obtained electronic scheduling information. The trans-vendor service then sends the sets of electronic scheduling information to the network manager 122 for processing. It should be noted that, in other embodiments, the network manager 122 is able to read and process electronic scheduling information in a variety of formats. It should also be noted that network manager 122, in some embodiments, is then trans-vendor service discussed above.

In another embodiment, the network manager 122 sends a request to NMDGs 116 on user devices 110, 112 for network management data 118. In this embodiment, the network manager 122 maintains a list of users who have subscribed to the network manager 122; installed an NMDG 116 on their device 110, 112; etc. The network manager 122 sends the request at predefined intervals; upon receiving an instruction from an administrator; and/or the like. Once an NMDG 116 receives the request, the NMDG 116 obtains network management data 118 associated with the user and/or user device and sends the data 118 to the network manager 122. It should be noted that the network manager 122 is not limited to obtaining network management data 118 from a user device 110, 112. For example, the network management data 118 can also be obtained from one or more remote servers that maintain network management data 118. In this embodiment, the network manager 118 communicates with the remote server(s) and obtains network management data 118 associated with one or more users and/or user devices 110, 112.

Once the network manager 122 has received a set of network management data 118, the estimator 202 analyzes the data 118 to estimate/predict user demand for network resources for a given entity 106, 108. In one embodiment, the estimator 202 identifies network management data 118 from the received set of network management data that is associated with a given managed entity 106, 108. For example, the network manager 122 maintains a list 208 of managed/monitored entities such as geographic locations, structures, networks, and/or events. FIG. 3 shows one example of this list 208. In the example shown in FIG. 3, the managed entity list is a table 300 comprising columns and rows. In this example, each row is a record associated with a given managed entity 106, 108 and each column comprises a set of attributes associated with the managed entity 106, 108. The table 300 comprises, for example, a first column entitled "ID" 302, a second column 304 entitled "Location", a third column entitled "Temporal Information" 306, and a fourth column "Keywords" 308.

Entries 310 under the first column 302 comprise a unique identifier for each entity 106 108 being managed/monitored by the network manager 122. Entries 312 under the second column 304 comprise location information for the managed entity 106, 108. This location information can include (but is not limited to) a set of latitude/longitude coordinates, an address(es), a floor number(s), a room number(s), a name of a building, and/or the like. Entries 314 under the third column 308 comprise temporal information such as dates and/or times for which the entity is being managed by the network manager 122, or when the managed entity is occurring (e.g., an event). Entries 316 under the fourth column 308 comprise one or more keywords associated with a given managed entity 106, 108. It should be noted that the table 300 is not limited to the examples shown in FIG. 3.

The estimator 202 utilizes the information in managed entity list 208 to identify network management data for a given entity 106, 108 and predict user demand for network resources. For example, the estimator 202 parses network management data 118 to identify one or more textual components of the data such as, (but not limited to) paragraphs, sentences, words, letters, numbers, characters, and/or the like. In one embodiment, the components of the data being identified are n-grams. The estimator 202 compares the identified textual components to the information within the managed entity list 208. The estimator 202 can compare the identified textual components to a plurality of records within the list 208 or to a single record associated with a given managed entity of interest.

If one or more textual components of the network management data 118 matches information in the managed entity list 208 for a given entity 106, the estimator 202 determines that the user associated with the analyzed network management data 118 will be associated with (e.g., be present at, utilize, take part in, etc.) the managed entity 106 at some future point in time. Therefore, the estimator 202 also determines that the user will require network resources associated with the managed entity 106 at this future point in time. The estimator 202 then increments a user count/concentration associated with the managed entity 106. This user count/concentration provides an estimate of the number of users that will be associated with the managed entity 106 at a future point in time. In addition, user count/concentration information can also be provided at various granularities such as for the managed entity as a whole or for specific locations within the managed entity 106. For example, if the network management data 118 associated with a user identifies a specific location within the managed entity 106 where the user will be located, the estimator 202 updates a user count/concentration for this specific area of the managed entity 106.

FIG. 4 shows various examples of electronic calendar entries 402 to 414 associated with a given user. In this example, the estimator 202 is interested in identifying users who will likely attend an event identified in the managed entity list 208 as "Entity_A". The estimator 202 parses the information within the electronic calendar entries 402 to 414 to identify one or more textual components of the entries such as (but not limited to) dates, times, sentences, words, numbers, characters, etc. The estimator 202 compares these textual components to the information within the managed entity list 208 for Event_A. In this example, the estimator 202 determines that a calendar entry 414 comprises the term "Tradeshow_A", which matches a keyword associated with Entity_A in the managed entity list 208. Therefore, the estimator 202 determines that the user associated with the calendar entries shown in FIG. 4 will likely be attending the event identified as Entity_A in the list 208. The estimator 202 then increments a user count associated with Entity_A.

It should be noted that the estimator 202 can perform a further analysis to increase the confidence level that the user will be attending Event_A. For example, the estimator 202 can further determine if the time and/or date associated with the calendar entry 414 comprising the keyword "Tradeshow_A" corresponds to the temporal information associated with Event_A in the managed entity list 208. If so, the estimator 202 determines that there is a greater likelihood that the user will attend Event_A. It should be noted that, in some embodiments, the estimator 202 only increments the user count associated with a given managed entity 106 if the identified components of network management data 118 match (or at least correspond to) two or more information types (e.g., unique ID, location information, temporal information, keywords, etc.) associated with the managed entity 106 in the list 208.

In another embodiment, the estimator 202 utilizes a combination of different types of network management data 118 to identify users that will be associated with a given managed entity 106 in the future. For example, FIG. 5 shows a social networking message 500 and FIG. 6 shows a travel reservation 600 associated with a user. In this example, the estimator 202 parses the social networking message 500. The estimator 202 determines that the message 500 comprises the words "tradeshow" and "New York", which match a keyword and location information, respectively, associated with managed entity "Entity_A". However, the social networking message 500 does not specify which tradeshow the user will be attending or the date and time of attendance. Therefore, the estimator 202 also analyzes other types of network management data 118 associated with the user such as the travel reservation 600 shown in FIG. 6. The estimator 202 determines that the travel reservation 600 indicates that the user will be travelling to New York from Date_A to Date_N. The estimator 202 also analyzes the temporal information for the managed entity Entity_A within the managed entity list 208. Based on this analysis the estimator 202 determines that the user's travel dates of Date_L to Date_P fall within the dates (Date_A to Date_Y) associated with Entity_A. Therefore, the estimator 202 determines that the user will be attending Entity_A. The estimator 202 increments the user count associated with Entity_A.

It should be noted that information within the network management data 122 is not required to exactly match the information with the managed entity list 208 associated with a given entity 106. For example, the estimator 202 can search for synonyms of managed entity keywords within the network management data 118. In another embodiment, the estimator 202 analyzes the context of network management data 118 to identify data that corresponds to information within the managed entity list 208. For example, consider one example where a managed entity 106 is a given business project (Project_B). In this example, the estimator 202 analyzes calendar entries for a plurality of users. The estimator 202 determines that two or more of these users have scheduled a meeting with each other. Although these calendar entries do not identify any details of the meeting, the estimator 202 determines based on the context of the entries that the meeting is associated with Project_B. For example, the business associated with Project_B provides information such as (but not limited to) an employee list associated with Project_B. Therefore, since the context of the calendar entries is a meeting between a plurality of the users identified in the employee list, the estimator 202 determines that the meeting is with respect to Project_B. The estimator 202 increments the user count for Project_B for at least the date and time associated with identified meeting.

In one embodiment, the user count/concentration for a managed entity 106 is used to estimate/predict a future user demand for network resources of one or more managed entities 106, 108. It should be noted that the estimator 202, in one embodiment, also utilizes historical user count/concentration information for a managed entity 106 to estimate/predict a future user demand for network resources of the managed entity 106. User demand can be determined as a function of the user count or concentration. For example, by determining the number of users that will be associated with a managed entity 106 the estimator 202 can estimate the amount and type of network resources that will be consumed and required. Stated differently, the estimator 202 can determine that X amount of users will require Y amount of network resources. The estimator 202 can make user demand estimates at various granularities. For example, the estimator 202 can estimate network resource demand for specific dates, times, and locations associated with a managed entity 106.

In another embodiment, user demand for network resources of a managed entity 106 is also determined as a function of a role associated with one or more of the users (or user devices 110, 112). For example, users can be associated with or assigned different roles such as (but not limited to) chief executive officer (CEO), vice president, manager, employee, outside contractor, a person who paid a fee, a person with a strong social network, celebrity, news reporter, student, ordinary user, politician, diplomat, presenter, security threat, and/or the like. A role of a user can be a role associated with a managed entity 106 or some other context.

The role identifier 204 of the network manager 122 automatically determines/identifies a role associated with a user/device in various ways. For example, the user can manually send his/her role for a given context (e.g., managed entity, work, event, etc.) to the role identifier 204 via the NMDG 116. In another example, the role identifier 204 sends a role request to user devices 110, 112. In this example, the NMDG 116 prompts the user for his/her role(s). The NMDG 116 then sends the role information along with any associated context to the role identifier 204.

In one embodiment, the role identifier 204 analyzes the network management data 118 for role information associated with a user identified by the estimator 202. For example, a user's social network information can be analyzed to determine a user's role. In this example, the role identifier 204 identifies a user's role from his/her social network profiles, messages, postings, comments, etc. The role identifier 204 can also identify the number of followers and/or friends the user has from the user's social networks. Also, attendee registration information for a managed entity 106 can be sent to the network manager 122. In this example, the role identifier 204 analyzes the attendee registration information to determine the role of a user. For example, the attendee registration information can identify a user as a presenter, a guest/visitor, a vice president of a company, and/or the like. It should be noted that in an embodiment where the network identifier 204 derives role information from social network connections, a user's role can dynamically change as events are generated. Once a user's role is identified, this role information is stored in a user profile or a role profile 212 for the users. It should be noted that embodiments of the present disclosure are not limited to roles associated with users. For example, one or more embodiments of the present disclosure determine roles associated with user devices 110, 112 or devices within the Internet of Things.

Role and social network information (e.g., number of followers or friends) is utilized by the estimator 202 to predict user demand for network resources of a given managed entity 106 at a future point in time. For example, if the role identifier 204 determines that a user's role is a celebrity with thousands of followers, the estimator 202 determines that at least a portion of these followers are likely to be present at the managed entity 106 where the user will be located. The estimator 202 increments the user count or concentration for this entity 106 based on the user's role and number of followers. For example, a given role type such as celebrity or reporter can be associated with one or more weights. The estimator 202 increments the user count or concentration based on the weight assigned to the identified role and/or the number of followers associated with the user. The estimator then determines a future user demand for network resources of the entity 106 based on the user count/concentration.

The network manager 122 utilizes the predicted demand and/or identified roles to dynamically manage networking resources associated with one or more of the entities 106, 108. For example, the network configurator 206 of the networking manager 122 triggers/performs one or more network configuration operations based on the predicted user demand and/or identified roles. In one embodiment, the network configurator 206 utilizes networking device profiles 210 and/or configuration rules 212 when performing one or more network configuration operations. FIG. 7 shows various examples of networking device profiles for a plurality of networking devices 102, 104. In this example, each row is a record associated with a given networking device 102. Each networking device profile comprises one or more of a Device ID 702, Device Type information 704, a Managed Entity ID 706, Device Location information 708, Security information 710, Operating Range information 712, Operating Band/Spectrum information 714, and/or the like. It should be noted that embodiments of the present disclosure are not limited to the examples shown in FIG. 7.

The Device ID 702 uniquely identifies the networking device 102 associated with the device profile. The Device Type information 704 identifies device type of the networking device 102. For example, the Device Type information 704 identifies a networking device as a router, wireless router, switch, mobile base station, and/or the like. The Managed Entity ID 706 identifies the managed entity 106 associated with the networking device 102. The Device Location information 708 identifies the location of the networking device 102. This location information can include (but is not limited to) a set of latitude/longitude coordinates, an address(es), a floor number(s), a room number(s), a name of a building, and/or the like. The Security information 710 identifies the security capabilities (if any) of the networking device 102. For example, this information can identify the types of security protocols, encryption protocols, or other security characteristics provided by the networking device 102. The Operating Range information 712 identifies the operating range (if any) of the networking. For example, this information can indicate that a given networking device has a maximum signal strength of 3000 feet. The Operating Band/Spectrum information 714 identifies the various wireless bands or spectrums that the networking device can utilize. It should be noted that in addition to device capabilities, the networking profiles can also include current operating characteristics of a networking device. For example, the current security settings, operating range, operating band/spectrum and signal intensities, etc. of a given device can also be included within its networking device profile 210.

The network configurator 206 utilizes the device profiles 210 for identifying networking devices to add (or activate) to a managed entity identity; identifying networking devices to remove (or deactivate) from a managed entity 106; identifying which characteristics of a networking device should be configured; identifying the current operating settings or attributes of a networking device; and/or the like. For example, based on a device's profile 210 the network configurator 206 can determine the maximum bandwidth that it can provide to connected user devices 102, 104. The network configurator 206 is then able to determine if the throughput of the device 102 can be increased of if another networking device should be added to the managed entity 106. In another example, the network configurator 206 determines the current security settings of a device 102 as well as the other security settings it provides based on its profile 210. The network configurator 206 is then able to determine how it can change the device's security settings. It should be noted that in some embodiments, the device profiles 210 are not required. In these embodiments, the network configurator 206 communicates with one or more networking devices, via their network manager interface 115, to obtain their operating characteristics and capabilities.

The network configuration rules 212 are utilized by the network configurator 206 to determine the network configuration operations that should be performed based on the estimated user demand for network resources, identified roles, and/or managed entities. These rules 212 can be general rules, which apply to a managed entity 106 as a whole, or can be rules that are specific to one or more networking devices 102, 104. FIG. 8 shows various examples of network configuration rules 802, 804, 806. Each rule 802, 804, 806 at least comprises an identifier 808 that uniquely identifies the rule; an identifier 810 of the managed entity 106 associated with the rule; an identifier 812 of the specific device(s) associated with the rule (if any); and the configuration operations 814 to be performed. The network configurator 206 analyzes a configuration rule for a managed entity 106 and/or its networking devices 102 to determine which configuration operations to perform based on the estimated user demand for networking resources and/or the roles identified for various users. For example, the first rule 802 shown in FIG. 8 states that if the bandwidth provided by the networking devices 102, 104 does not meet the estimated user demand then one or more networking devices are to be added to the managed entity 106 to satisfy the estimated demand. It should be noted that, in some embodiment, the configuration rules are not required.

In one embodiment, the network configurator 206 performs network configuration operations as a function of the estimated user demand, user role, and managed entity. For example, the network configurator 206 is able to add new networking devices to a managed entity 106 or activate existing networking devices 102 of the managed entity 106 to ensure the estimated user demand for networking resources is satisfied. The networking configurator 206 can also remove or deactivate existing networking devices 102, 104 as well. Also, if the network manager 122 determines that a user with a role such as celebrity or reporter will be within a given area of the managed entity 106, the network configurator 206 is able to increase the networking resources for that specific area. For example, the network configurator 206 is able to increase the bandwidth for that area by adding or activating additional network resources.

In some embodiment, the network configurator 206 moves networking devices 102, 104 to different locations within a managed entity 106, 108 to provide additional networking resources to areas of the managed entity 106 estimated to have higher user concentrations. In addition, the network configurator 206 can configure one or more networking devices 104, 106 to increase or decrease the amount of bandwidth provided to satisfy the estimated user demand. Also, the network configurator 206 may adjust the operating characteristics of networking devices such as security settings, operating ranges, signal intensities, operating bands/spectrums, and/or the like to ensure user demand for networking resources is satisfied.

In other embodiments, the network configurator 206 identifies users associated with a given role, and prompts these users to move to a different area of the managed entity to receive increased WiFi coverage, security, increased bandwidth, and/or the like. Similarly, the network configurator 206 is able to decrease network resources within an area of the managed entity where a user or device identified as a security threat has been identified. Also, the network configuration 206 is able to prompt user devices and/or network devices to switch to a less congested wireless band. It should be noted that embodiments of the present disclosure are not limited to the network configuration operations discussed above.

Consider the following example where a managed entity 106 is a given geographical comprising a networking device 102 such as a WiFi hotspot. Based on analyzing network management data 118 of a plurality of users, the network manager 122 estimates a user concentration/count of M for the geographical area. The network manager 122 also estimates that the user demand for network resources (e.g., bandwidth) is Z based on the estimated user count/concentration. The network configurator 206 analyzes the networking device profile 210 of the WiFi hotspot. Based on the information within the device profile 210, the network configurator 206 determines that the WiFi hotspot is only able to provide a bandwidth of I to the users, where I<Z. Therefore, the network configurator 206 determines that the WiFi hotspot will not be able to satisfy the estimated user demand.

The network configurator 206 analyzes the configuration rules 214 for the managed entity 106 and determines that at least one new network device such as a WiFi hotspot should be deployed within the geographical area. In one embodiment, the network configurator 206 automatically deploys the at least one new WiFi hotspot. In another embodiment, the network configuration 206 notifies one or more administrators to deploy the new WiFi hotspot. Automatic deployment of a new network device can be performed in various ways. For example, the network configurator 206 can activate (e.g., turn on) a network device within the managed entity. In another example, the network configurator 206 can deploy unmanned aerial vehicles (UAVs) with wireless routers or base stations. After deployment of the new networking device, the estimated user demand for bandwidth can be satisfied by the WiFi hotspots within the geographical area.

As can be seen from the above discussion, networking resources are automatically and efficiently managed based on estimated user concentrations and predicted networking resource demand for a given area. Network operating characteristics such as bandwidth, device location, security, and device capabilities for a given area are dynamically configured based on the estimated user concentrations networking resource demand In addition, user and/or device roles can be further utilized to dynamically configure network operating characteristics for a given area.

Operational Flow Diagrams

Figure 9:
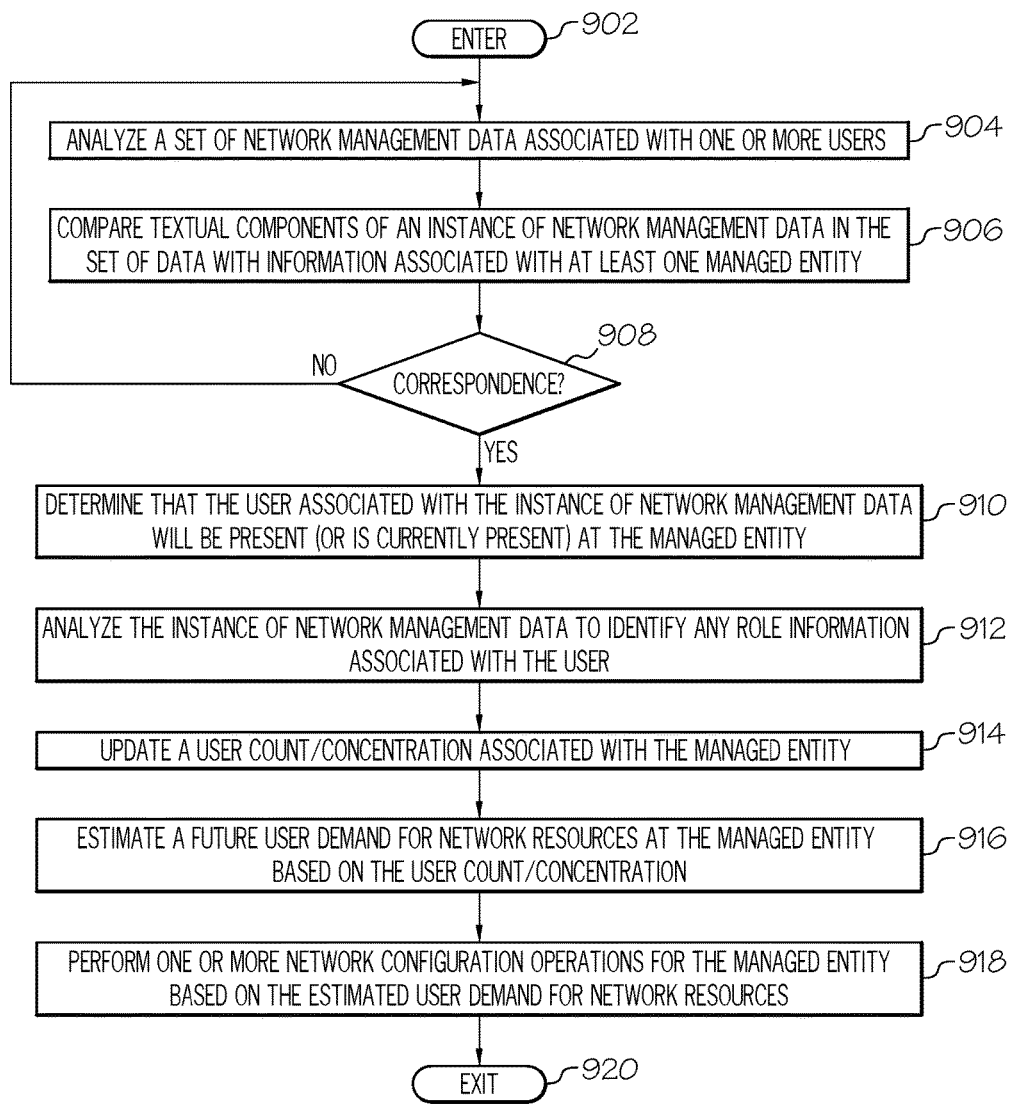
FIG. 9 is an operational flow diagram illustrating one example of managing a network according to one embodiment of the present disclosure.

FIG. 9 is an operational flow diagram illustrating one example of managing a network based on one or more embodiments of the present disclosure. The operational flow diagram of FIG. 9 begins at step 902 and flows directly to step 904. The network manager 122, at step 904, analyzes a set of network management data 118 associated with one or more users. The network manager 122, at step 906, compares textual components of an instance of network management data in the set of data 118 with information associated at least one managed entity 106. The network manager 122, at step 908, determines if there is a correspondence between the textual components of the network management data instance and the managed entity information. If the result of this determination is negative, the network manager 122 continues to analyze the remaining instances of network management data in the set of data 118. If the result of this determination is positive, the network manager 122, at step 910, determines that the user associated with the instance of network management data will be present (or is currently present) at the managed entity 106.

The network manager 122, at step 912, further analyzes the instance of network management data to identify any role information associated with the user. The network manager 122, at step 914, updates a user count/concentration associated with the managed entity 106 to indicate the user will be present (or is currently present) at the managed entity 106. It should be noted that the network manager 122 can also update the user count/concentration based on any role information identified for the user as well. The network manager 122, at step 916, estimates a future user demand for network resources at the managed entity 106 based on the user count/concentration. The network manager 122, at step 918, performs one or more network configuration operations for the managed entity 106 based on the estimated user demand for network resources and optionally any role information associated with users identified to be present at the managed entity 106. The control flow exits at step 920.

Information Processing System

Figure 10:
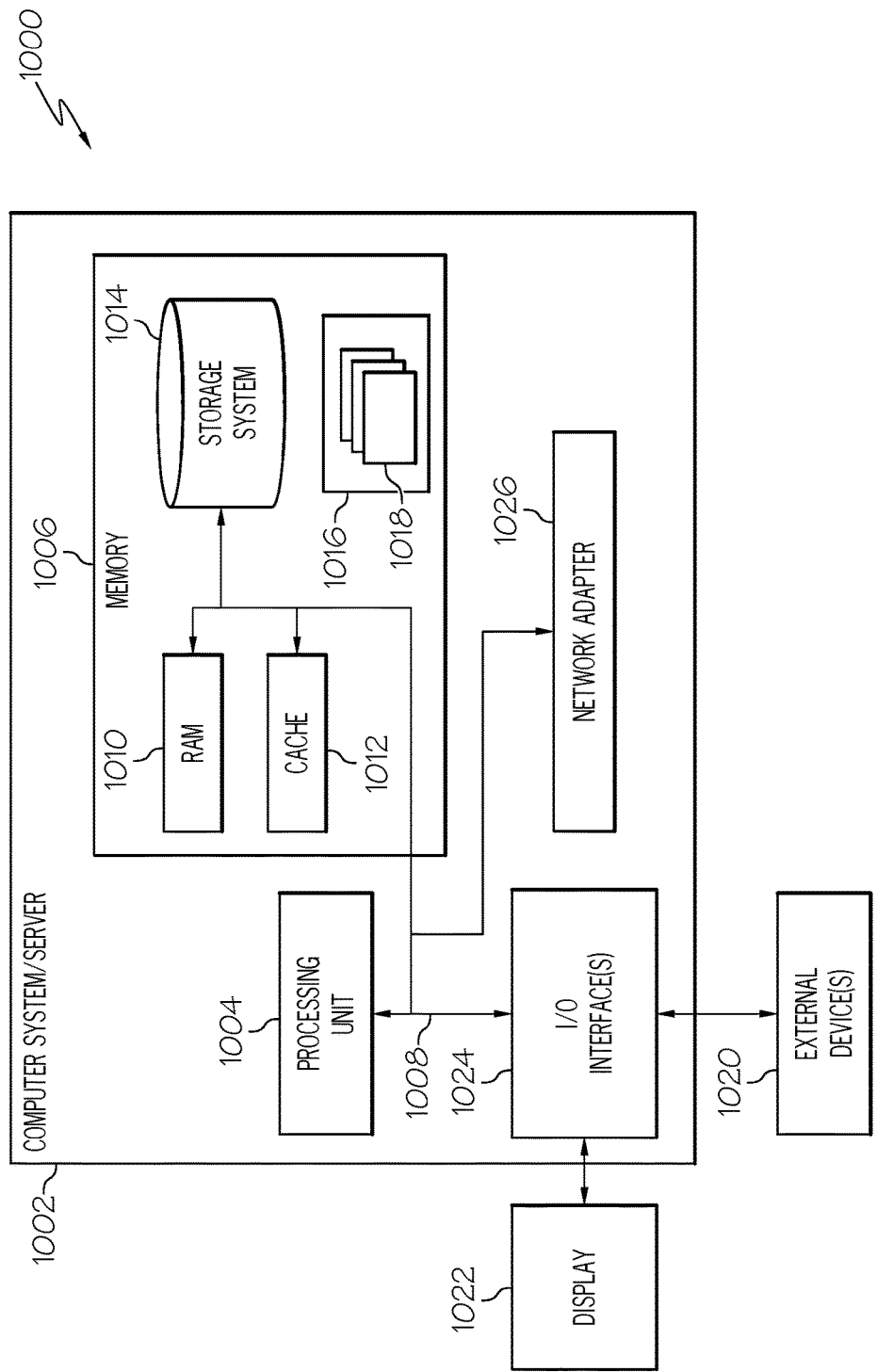
FIG. 10 is a block diagram illustrating one example of an information processing system according to one embodiment of the present disclosure.

Referring now to FIG. 10, this figure is a block diagram illustrating an information processing system that can be utilized in various embodiments of the present disclosure. The information processing system 1002 is based upon a suitably configured processing system configured to implement one or more embodiments of the present disclosure. Any suitably configured processing system can be used as the information processing system 1002 in embodiments of the present disclosure. The components of the information processing system 1002 can include, but are not limited to, one or more processors or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 10, the main memory 1006 includes at least the network manager 122 and its components shown in FIG. 1. Each of these components can reside within the processor 1004, or be a separate hardware component. The system memory 1006 can also include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of an embodiment of the present disclosure.

Program/utility 1016, having a set of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of embodiments of the present disclosure.

The information processing system 1002 can also communicate with one or more external devices 1020 such as a keyboard, a pointing device, a display 1022, etc.; one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing computing networks, the method comprising:
    obtaining a set of network management data associated with one or more users, wherein the set of network management at least comprises electronic event scheduling information associated with the one or more users, where the electronic event scheduling information for each user of the one or more users comprises event scheduling data associated with at least one of a set of scheduled events associated with the user;
    analyzing the set of network management data;
    identifying, based on the set of network management data, a role associated with at least one of the one or more users;
    determining a role type associated with the role from a plurality of role types, wherein each role type is associated with a weight;
    determining at least one of a number of network followers or a number of social network friends associated with the at least one of the one or more users;
    predicting, based on the analyzing and the electronic event scheduling information associated with the one or more users, a concentration of users for a given location corresponding to a location associated with the electronic event scheduling information, wherein the concentration of users is increased based on the number of network followers or a number of social network friends associated with the at least one of the one or more users; and
    configuring at least one network characteristic associated with the given location based on at least the predicted concentration of users for the given location.

2. The method of claim 1, wherein analyzing the set of network management data comprises:
    identifying a set of textual components of the set of network management data;
    comparing the set of textual components to at least one attribute associated with the given location;
    determining that one or more of the set of textual components correspond to the at least attribute associated with the given location; and
    determining that at least one of the one or more users will be present at the given location at a future point in time based on determining that one or more of the set of textual components correspond to the at least one attribute associated with the given location.

3. The method of claim 2, wherein the at least one attribute comprises one or more of:
    temporal information;
    location information; and
    keyword information.

4. The method of claim 1, further comprising:
    estimating, based on the concentration of users for the given location, a user demand for network resources at the given location,
    wherein the at least one network characteristic is configured based on the user demand for network resources.

5. The method of claim 1, wherein configuring at least one network characteristic comprises at least one of:
    deploying at least one networking device to the given location, wherein the at least one networking device communicatively couples one or more user devices to at least one network; and
    changing a set of security attributes associated with at least one networking device associated with the given location.

6. The method of claim 1, wherein the set of network management data further comprises one or more of:
    a set of social networking information; and
    a set of electronic messaging information.

7. The method of claim 1, wherein the electronic scheduling information comprises one or more of:
    a set of calendar entries; and
    a set of travel reservations.

8. The method of claim 1, further comprising:
    accessing a plurality of electronic calendar information sets associated with at least one user, wherein two or more of the plurality of electronic calendar information sets are provided by a different service provider and in different formats;
    analyzing the plurality of electronic calendar information sets; and
    storing, based on the analyzing, the plurality of electronic calendar information sets in the set of network management data.

9. The method of claim 1, wherein the network management data is obtained from at least an electronic calendar.

10. A method for managing computing networks, the method comprising:

obtaining a set of network management data associated with one or more users, wherein the set of network management at least comprises electronic event scheduling information associated with the one or more users, where the electronic event scheduling information for each user of the one or more users comprises event scheduling data associated with at least one of a set of scheduled events associated with the user;

analyzing the set of network management data;

determining at least one of a number of network followers or a number of social network friends associated with the at least one of the one or more users;

predicting, based on the analyzing and the electronic event scheduling information associated with the one or more users, a concentration of users for a given location corresponding to a location associated with the electronic event scheduling information, wherein the predicted concentration of users is based, at least in part, on the event scheduling information associated with the one or more users matching a plurality of different information types associated with the given location, and wherein the concentration of users is increased based on the number of network followers or a number of social network friends associated with the at least one of the one or more users; and configuring at least one network characteristic associated with the given location based on at least the predicted concentration of users for the given location.

11. The method of claim 10, wherein analyzing the set of network management data comprises:

identifying a set of textual components of the set of network management data;

comparing the set of textual components to at least one attribute associated with the given location;

determining that one or more of the set of textual components correspond to the at least attribute associated with the given location; and determining that at least one of the one or more users will be present at the given location at a future point in time based on determining that one or more of the set of textual components correspond to the at least one attribute associated with the given location.

12. The method of claim 11, wherein the at least one attribute comprises one or more of:

temporal information;

location information; and keyword information.

13. The method of claim 10, further comprising:

estimating, based on the concentration of users for the given location, a user demand for network resources at the given location, wherein the at least one network characteristic is configured based on the user demand for network resources.

14. The method of claim 10, further comprising:

identifying a role associated with each of the one or more users, wherein the at least one network characteristic is further configured based on the role that has been identified.

15. The method of claim 10, wherein configuring at least one network characteristic comprises at least one of:

deploying at least one networking device to the given location, wherein the at least one networking device communicatively couples one or more user devices to at least one network; and changing a set of security attributes associated with at least one networking device associated with the given location.

16. The method of claim 10, wherein the set of network management data further comprises one or more of:

a set of social networking information; and a set of electronic messaging information.

17. The method of claim 10, further comprising:

accessing a plurality of electronic calendar information sets associated with at least one user, wherein two or more of the plurality of electronic calendar information sets are provided by a different service provider and in different formats;

analyzing the plurality of electronic calendar information sets; and storing, based on the analyzing, the plurality of electronic calendar information sets in the set of network management data.

18. The method of claim 10, wherein the network management data is obtained from at least an electronic calendar.

* * * * *